United States Patent [19]
Pawlak

[11] 3,735,285
[45] May 22, 1973

[54] SOLID-STATE LASER
[75] Inventor: Felix Romain Pawlak, Paris, France
[73] Assignee: U.S. Philips Corporation, New York, N.Y.
[22] Filed: May 1, 1972
[21] Appl. No.: 249,370

[30] Foreign Application Priority Data
Dec. 4, 1970 France.................................7043668

[52] U.S. Cl..................................................331/94.5
[51] Int. Cl...................................................H01s 3/02
[58] Field of Search........................331/94.5; 330/4.3

[56] References Cited
UNITED STATES PATENTS
3,423,697  1/1969  Chernock..............................331/94.5
3,560,872  2/1971  Heimann..............................331/94.5

Primary Examiner—William L. Sikes
Attorney—Frank R. Trifari

[57] ABSTRACT

A crystal laser in which the laser crystal and the mirrors of the interferrometer are uncoupled mechanically from the pumping cavity. Due to this uncoupling, the stability of the laser is considerably improved. The construction of the pumping cavity is preferably such that part of it can be mounted or dismantled around the crystal without disturbing the critical adjustment of the mirrors and the crystal.

3 Claims, 4 Drawing Figures

Patented May 22, 1973  3,735,285

SOLID-STATE LASER

The invention relates to a solid-state laser comprising a pumping cavity and an interferometer which is formed by two mirrors and by a laser crystal which is mounted between the mirrors and is surrounded by the pumping cavity.

Such lasers are known, for example, from French Pat. specification No. 1,591,183.

The pumping cavity which has an at least partly reflecting inner surface serves to concentrate the light emitted by an excitation source onto the laser crystal. The excitation source which is formed by one or more light sources which can emit light of a given wavelength and the laser crystal should be arranged in the pumping space so that the (efficiency of the laser is maximum efficiency of the laser being understood to mean herein, for example, the ratio between the power to be emitted by the laser and the power dissipated by the excitation source).

The pumping cavity may be in the form, for example, of a cylinder which is closed by, two side surfaces, or covers which extend substantially at right angles to the axis of the cylinder. In many cases, however, the pumping cavity has a cylindrical-elliptical form which is also sealed by side surfaces, the excitation source being provided along one of the focal lines and the laser crystal being provided along the other focal line.

In known lasers of the above-mentioned type the excitation source and the crystal are mounted on the side surfaces which close the pumping cavity. The mirrors, possibly together with means for accurately adjusting the mirrors, are also mounted either on said side surfaces, or on a separate support or holder.

As a result of this type of mounting, mechanical disturbances or deformations of the pumping cavity as a result of temperature variations which are caused during operation by the energy dissipation of the excitation source, can be transmitted directly to the laser crystal and possibly to the mirrors. This may result in miscontrol of the interferometer (mirrors and crystal) as a result of which the output power of the laser can be considerably reduced.

Although the temperature variations in the pump can be considerably reduced by cooling the pump, for example, by means of a cooling liquid, it has been found, however, that despite dissipation of a large part of the energy by the cooling liquid, the thermal effects in many cases nevertheless remain sufficiently large and exert a disturbing influence on the adjustment of the interferometer.

Furthermore, in known lasers, the mirrors and the laser crystal are mounted either on the pumping cavity or on different parts of the laser. It is often necessary to dismantle the interferometer for replacement of the excitation source, or for repolishing the reflecting inner surface of the pumping cavity. This results in frequent readjustment of the interferometer, which is a very critical operation.

It is one of the objects of the invention to provide a crystal laser in which the aforementioned drawbacks are substantially avoided.

The invention is inter alia based on the recognition of the fact that the part of the laser which is most sensitive to disturbances, is formed by the interferometer consisting of the laser crystal and the mirrors, and that it is therefore advantageous to mount the laser crystal and the mirrors collectively on a separate holder.

Therefore, a laser of the type mentioned above is characterized according to the invention in that the interferometer and the pumping cavity form part of two assemblies in which one assembly, hereinafter termed the first assembly, comprises a substantially non-deformable holder on which the interferometer is mounted, and the other assembly comprises the pumping cavity. The two assemblies are mounted separately on a substantially non-deformable support as a result of which the pumping cavity and the interferometer are substantially entirely uncoupled mechanically relative to each other.

Since the whole interferometer is mechanically uncoupled from the pumping cavity, deformations of the pumping cavity as a result of, for example, temperature variations will exert substantially no influence on the adjustment of, for example, the crystal relative to the mirrors.

The pumping cavity and the holder on which the interferometer is mounted may advantageously consist of those materials which are most suitable with respect to, for example, the heat exchange and the rigidity. A preferred embodiment according to the invention is characterized in that the holder on which the interferometer is mounted, is manufactured from a metal having a comparatively low coefficient of thermal conductivity, and the pumping cavity is manufactured from a metal having a comparatively high coefficient of thermal conductivity.

Since the interferometer and the pumping cavity of the invention are uncoupled mechanically relative to each other, the pumping cavity can be mounted and/or dismantled without the adjustment of the interferometer being disturbed.

A further preferred embodiment according to the invention is characterized in that the pumping cavity is composed of a number of detachable parts which can be provided separately around the laser crystal.

In order that the invention may be readily carried into effect, one embodiment thereof will now be described in greater detail, by way of example, with reference to the accompanying drawings, in which FIG. 1 is a front elevation of a laser according to the invention, of which FIG. 2 are two cross-sectional views taken on the lines AA' and BB' of FIG. 1.

Figure 1:
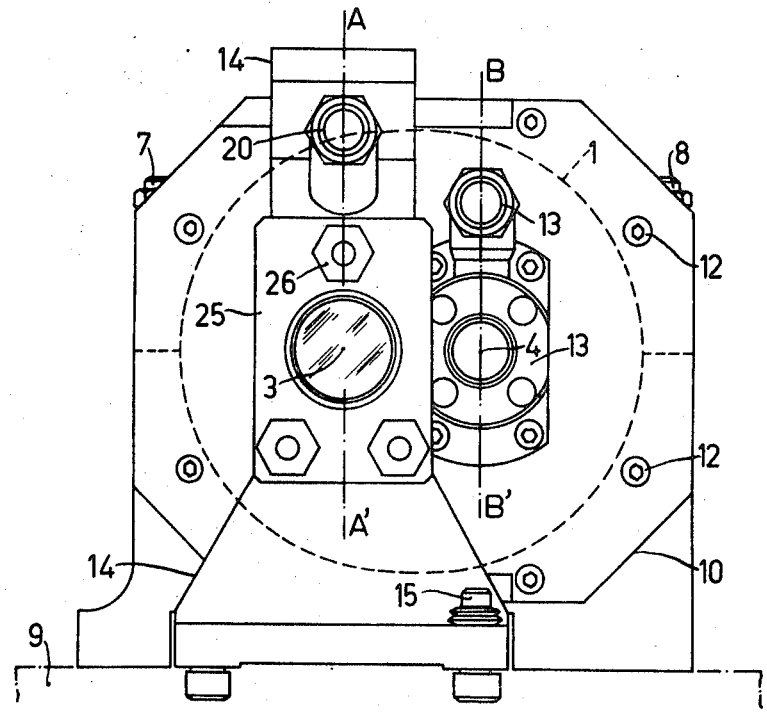
Figure 4:
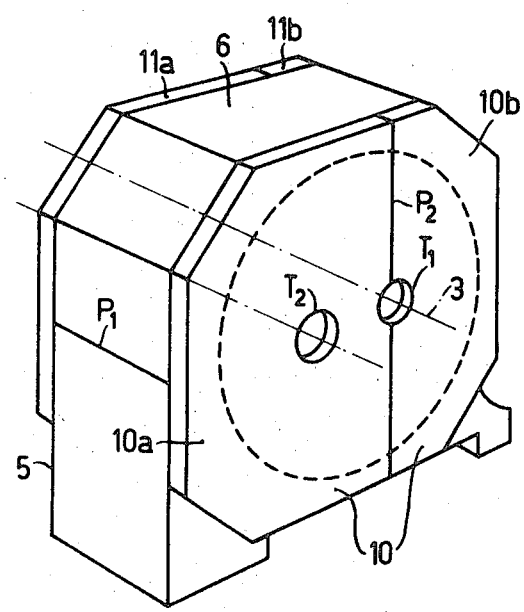
FIG. 4 shows diagrammatically the pumping cavity of the laser shown in FIGS. 1 and 3.

In FIG. 1, the broken line 1 denotes an elliptical cross-section of the reflecting elliptical-cylindrical pumping cavity, and which is shown separately in FIG. 4. The dots 3 and 4 in FIG. 1 constitute the foci of the elliptical cross-section. The laser crystal is provided along the focal line which is associated with dot 3, while the excitation source is provided along the focal line associated with dot 4.

Figure 3:
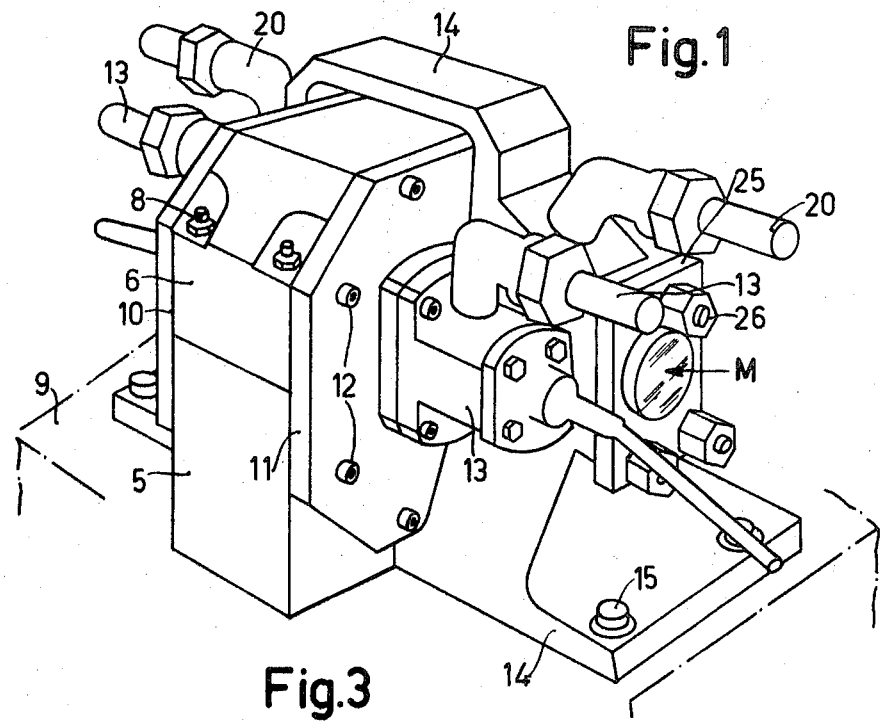
FIG. 3 is a perspective view of the laser shown in FIG. 1.

As is shown in FIGS. 3 and 4, the pumping cavity comprises two parts 5 and 6 which, assembled along the boundary plane P1, constitute the elliptical-cylindrical reflecting surface 2. The parts 5 and 6 are secured to a support 9 by means of ties passed through said parts and by means of bolts and nuts.

Figure 2:
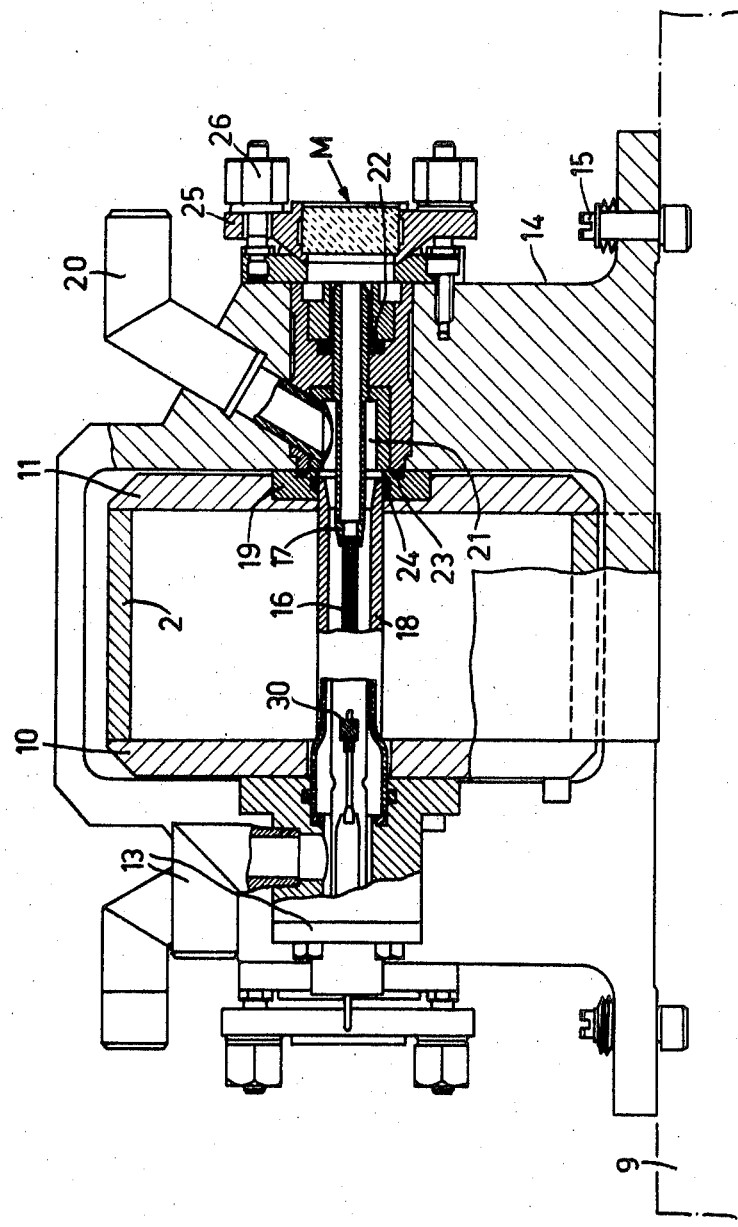

As is shown in FIGS. 2 and 3, the pumping cavity 2 is closed by two side walls or covers 10 and 11 which are secured to the parts 5 and 6 by means of bolts 12.

As shown in FIG. 4, the covers 10 and 11 are each formed by two parts 10a, 10b and 11a, 11b, respectively, which adjoin each other along the plane P2. The plane P2 intersects the focal line 3 along which the laser crystal is mounted. The covers 10 and 11 furthermore comprise apertures $T_1$ and $T_2$ in behalf of the laser crystal and the excitation source, the boundary plane $P_2$ intersecting the aperture $T_1$.

Connection means 13 to a cooling system in behalf of the excitation source 30 are furthermore provided on the covers 10 and 11 (see FIG. 2). Said connection means 13 are such that the source 30 is mechanically coupled directly to the pumping cavity 2 and hence constitutes a mechanical unit together with the pumping cavity.

On the contrary, the interferometer of the laser (interferometer being understood to mean the mirrors M together with the laser crystal) has no direct mechanical coupling to the pumping cavity but is secured to the holder 14 which is also mounted on the support 9 by vibration-free means 15.

In addition to serving as a holder for the interferometer, the holder 14 is also provided with a cooling system in behalf of the crystal. This part of the holder 14 as well as the said cooling system and the interferometer are shown in the right-hand part of FIG. 2, which part is a sectional view through the laser taken on the line AA' of FIG. 1.

It will be obvious that the right-hand half of FIG. 2 shows a part of the cross-section taken on the line AA' and the left-hand half of FIG. 2 a part of the cross-section taken on the line BB' of FIG. 1.

The laser crystal, denoted by 16, is formed by a YAG crystal which is doped with $Nd^{3+}$ and clamped in parts 17 which are manufactured from a material having a coefficient of expansion of the same order of magnitude as the YAG crystal.

The crystal 16 is surrounded by a tube 18 of quartz which is permeable to the radiation to be emitted by the excitation source 30. The tube 18 through which a cooling liquid can be conducted is mounted in parts 19. The tubes through which the cooling liquid can be supplied and removed, respectively, and which are denoted by 20 open into annular spaces 21. The cooling system is sealed by means of sealing rings or O-rings 22, 23, 24 which are provided in suitable recesses.

The mirrors M are secured to the holder 14 in the usual manner by means of members 25 the angle of which relative to the holder 14 is adjustable by means of three bolt-nut connections 26.

As regards the nature of the materials used it is interesting to note that the holder 14 is constructed from stainless steel with the object of, on the one hand, restricting the heat exchange with the atmosphere and, on the other hand, ensuring a sufficient rigidity in behalf of the interferometer.

The pumping cavity 5, 6 and the covers 10 and 11 on the contrary are constructed from aluminum to obtain a good heat dissipation during operation and a good heat exchange with the atmosphere.

The support 9 on which the holder 19 and the pumping cavity 5, 6 are mounted has a high heat capacity and is substantially not deformed during operation as a result of the heat exchange with the pumping space.

It will be obvious that as a result of the construction of the pumping cavity of FIG. 4 consisting of the parts 5 and 6 and of the covers 10 and 11 which each consist of two parts 10a, 10b and 11a, 11b, respectively, the pumping cavity can be mounted and/or dismantled without it being necessary to change the adjustment of the interferometer.

It is to be noted that the laser described here has functioned at powers of the order of 2,000 Watt without miscontrol of the interferometer.

What is claimed is:

1. A solid-state laser comprising a pumping cavity and an interferrometer which is formed by two mirrors and by a laser crystal which is mounted between the mirrors and is surrounded by the pumping cavity, said interferrometer and the pumping cavity forming part of two assemblies in which a first assembly comprises a substantially non-deformable holder on which the interferrometer is mounted, and a second assembly comprises the pumping cavity, and in which the two assemblies are mounted separately on a substantially non-deformable support as a result of which the pumping cavity and the interferometer are substantially entirely uncoupled mechanically relative to each other.

2. A solid-state laser as claimed in claim 1, wherein the holder on which the interferometer is mounted is manufactured from a metal having a comparatively low coefficient of thermal conductivity and the pumping cavity is manufactured from a metal having a comparatively high coefficient of thermal conductivity.

3. A solid-state laser as claimed in claim 1, the pumping cavity is composed of a number of detachable parts which can be provided separately around the crystal.

* * * * *